(12) United States Patent
Tatsumi

(10) Patent No.: US 8,830,994 B2
(45) Date of Patent: Sep. 9, 2014

(54) NETWORK SYSTEM

(75) Inventor: Tomoyoshi Tatsumi, Tsuchiura (JP)

(73) Assignee: Hitachi Metals, Ltd., Tokyo (JP)

( * ) Notice: Subject to any disclaimer, the term of this patent is extended or adjusted under 35 U.S.C. 154(b) by 46 days.

(21) Appl. No.: 13/553,752

(22) Filed: Jul. 19, 2012

(65) Prior Publication Data

US 2013/0077622 A1 Mar. 28, 2013

(30) Foreign Application Priority Data

Sep. 27, 2011 (JP) ................................. 2011-210528

(51) Int. Cl.
*H04Q 11/00* (2006.01)
*H04L 12/28* (2006.01)

(52) U.S. Cl.
CPC ............. *H04L 12/2867* (2013.01); *Y02B 60/33* (2013.01)
USPC ........... 370/386; 370/254; 370/396; 370/419; 709/239; 709/240; 709/244

(58) Field of Classification Search
None
See application file for complete search history.

(56) References Cited

U.S. PATENT DOCUMENTS

| | | | |
|---|---|---|---|
| 6,058,116 A | 5/2000 | Hiscock et al. | |
| 6,195,349 B1 | 2/2001 | Hiscock et al. | |
| 7,139,267 B2 * | 11/2006 | Lu et al. | 370/386 |
| 8,284,791 B2 * | 10/2012 | Unger et al. | 370/419 |
| 2007/0133618 A1 * | 6/2007 | Brolin | 370/514 |
| 2010/0316053 A1 | 12/2010 | Miyoshi et al. | |
| 2011/0080855 A1 * | 4/2011 | Fung | 370/256 |
| 2011/0194562 A1 * | 8/2011 | Simmons et al. | 370/395.31 |
| 2013/0083797 A9 * | 4/2013 | Narasimhan | 370/392 |

FOREIGN PATENT DOCUMENTS

| | | |
|---|---|---|
| JP | 2009-290271 A | 12/2009 |
| JP | 2010-288168 A | 12/2010 |

* cited by examiner

*Primary Examiner* — Ian N Moore
*Assistant Examiner* — Latresa McCallum
(74) *Attorney, Agent, or Firm* — McGinn IP Law Group, PLLC

(57) ABSTRACT

A network system includes a plurality of lower switching hubs, and upper switching hubs connected to each of the lower switching hubs, to relay a normal frame to be transmitted and received between the lower switching hubs. Each of the lower switching hubs includes a lower switch configuring portion for configuring a first link aggregation group for all ports connected to the upper switching hub, and transmitting a first control frame containing its own identifier from all the ports connected to the one or more upper switching hubs. Each of the upper switching hubs includes an upper switch configuring portion for configuring a second link aggregation group for ports connected to a same lower switching hub, based on the first control frames received from the lower switching hubs, and transmitting a second control frame containing its own identifier from the ports configured as the second link aggregation group.

14 Claims, 5 Drawing Sheets

NETWORK SYSTEM

The present application is based on Japanese patent application No. 2011-210528 filed on Sep. 27, 2011, the entire contents of which are incorporated herein by reference.

BACKGROUND OF THE INVENTION

1. Field of the Invention

This invention relates to a network system, more particularly, to a network system which has a plurality of lower switching hubs connected to network devices such as servers, storages and the like, and one or more upper switching hubs connected to each of the lower switching hubs, to relay normal frames transmitted and received between the lower switching hubs.

2. Description of the Related Art

In recent years, a network system having a broadband and band of which is extendable in the future has been required in accordance with an increase in information transmission quantity.

Accordingly, a network system using a plurality of switching hubs to realize a large-capacity virtual switching hub has been suggested by e.g. JP-A-2010-288168.

This network system has a plurality of lower switching hubs connected to network devices such as servers, storages and the like, and one or more upper switching hubs connected to each of the lower switching hubs, to relay normal frames transmitted and received between the lower switching hubs. This network system has a multipath configuration in which each lower switching hub is connected to all the upper switching hubs. Herein, the lower switching hub is referred to as port switch (PS) and the upper switching hub is referred to as fabric switch (FS).

Now, this network system is configured by using link aggregation. The Inventor has been developing a network system, which automatically configures a LAG (link aggregation group) by transmitting and receiving control frames between the port switches and the fabric switches. It should be noted that the link aggregation is a technique for virtually bundling a plurality of lines, to treat the bundled lines as if a single line, and is defined by IEEE802.3ad standard.

Here, automatic LAG configurations in the port switches and the fabric switches will be specifically explained.

The port switch is configured to transmit a control frame containing its own (source port switch) identifier, at predetermined time intervals, from all the ports connected to the fabric switches. Also, the fabric switch is configured to transmit a control frame containing its own (source fabric switch) identifier, the number of connected port switches, and connected port switch identifiers, at predetermined time intervals, from all the ports connected to the port switches.

In the port switch, a LAG is configured for all the ports connected to the fabric switches. The LAG configured at this point is referred to as a main link. Incidentally, in the port switch, the ports connectable to the fabric switches are predetermined, so that the main link is pre-configured for all of the ports connectable to the fabric switches.

Also, in the port switch, based on the contents of the control frames received from the fabric switches, a sub-link is configured for the ports connected to the same fabric switch. More specifically, in the port switch, a sub-link is configured for the ports received the control frames containing a maximum value of "the number of connected port switches" and the same "source fabric switch identifier". Of the ports in the main link, the ports for which no sub-link is configured are disabled (prohibited) to transmit the normal frame, while the ports for which sub-links are configured are enabled (permitted) to transmit the normal frame.

On the other hand, in the fabric switch, a LAG is configured for the ports connected to the same port switch based on the contents, i.e. the source port switch identifier, of the control frames received from the port switches. Similarly to the port switch, the LAG configured at this point is referred to as sub-link. Incidentally, in the fabric switch, no LAG corresponding to the main link in the above port switch is configured.

With the use of the LAG, the ports for transmitting the normal frames are sorted in accordance with the contents such as source address, destination address of normal frames to be transmitted, thereby load is distributed, so that data can be transmitted at once. Therefore, the forwarding rate can be great, and the band can be extended. It should be noted that the normal frames are normal Ethernet (trademark) frames relayed with the port switch or the fabric switch.

In this network system, it is possible to flexibly extend the ports or extend the band by adding the port switches or the fabric switches appropriately. There is an advantage of reducing the cost for system introduction.

According to this network system, since a redundant configuration can be realized, there is another advantage that, even in the event of a failure of any path such as a transmission line between switches, communication can be continued through another path.

SUMMARY OF THE INVENTION

In the above described network system, however, a failure may occur, when a further transmission line is added (linked up) to the port switches and the fabric switches already connected together.

The failure occurs at this point is concretely described using FIGS. 4A to 4C. Incidentally, in FIGS. 4A to 4C, hatched ports indicate ports for which sub-links are being configured, while unhatched ports indicate ports for which no sub-link is being configured.

A case as shown in FIG. 4A is considered, in which ports 2, 3 of a port switch (PS) 41, and ports 2, 3 of a fabric switch (FS) 42 are connected together by transmission lines such as LAN cables, respectively. Also, in both of the port switch 41 and the fabric switch 42, the sub-links are configured for the ports 2, 3. In the port switch 41, a main link is configured for all the ports connectable to the fabric switch 42.

Here, as shown in FIG. 4B, ports 1 of both the switches 41 and 42 are connected (linked up) together by a transmission line. Both the switches 41 and 42 transmit control frames at predetermined time intervals, but both the switches 41 and 42 operate independently, therefore resulting in either the switch 41 or 42 first receiving the control frames.

Here, a case in that the port switch 41 first receives a control frame is considered. Since an identifier contained in the received control frame is an identifier of the fabric switch 42, the port switch 41 received the control frame in the port 1 adds the port 1 to the sub-link configured for the ports 2, 3. As a result, the sub-link is configured for the port 1 of the port switch 41, but no sub-link is configured for the port 1 of the fabric switch 42.

In this state, if a normal frame destination of which is a broadcast, or destination of which is not learned by an FDB (Forwarding Database), i.e. a correlation between the destination and the output port is not learned in the fabric switch 42 is transmitted from the port switch 41 to the fabric switch 42 via the port 2 or the port 3 as shown in FIG. 4C, then the fabric switch 42 received the normal frame forwards the normal frame to all ports other than the ports 2, 3 for which the sub-link is being configured including the receiving port 2, and also causes the normal frame to be transmitted from the port 1 for which no sub-link is being configured.

As a result, such an unlikely circumstance in the normal network occurs that the normal frame transmitted from the port switch 41 turns back at the fabric switch 42 again to the port switch 41. Such a turning back of the normal frame is considered to be likely to interfere with the FDB learning in the port switch 41, and also cause no normal communication. Therefore, it is necessary to solve the above problem.

In view of the above circumstances, it is an object of the invention to provide a network system which obviates a failure during automatic LAG configuration.

According to a feature of the invention, a network system comprises:

a plurality of lower switching hubs; and
one or more upper switching hubs connected to each of the lower switching hubs, to relay a normal frame to be transmitted and received between the lower switching hubs;
in which each of the lower switching hubs includes a lower switch configuring portion for configuring a first link aggregation group for all ports connected to the upper switching hub, and transmitting a first control frame containing its own identifier from all the ports connected to the one or more upper switching hubs,
in which each of the upper switching hubs includes an upper switch configuring portion for configuring a second link aggregation group for ports connected to the same lower switching hub, based on the first control frames received from the lower switching hubs, and transmitting a second control frame containing its own identifier from the ports configured as the second link aggregation group, and
in which the upper switch configuring portion is configured to prohibit transmission and reception of the normal frame and transmission of the second control frame at a port which is not configured as the second link aggregation group.

In the network system, the upper switch configuring portion may be configured to, when receiving the first control frame at the port which is not configured as the second link aggregation group, configure the second link aggregation group for the port received the first control frame, thereafter release the prohibition of the normal frame transmission and reception, and begin the second control frame transmission.

In the network system, the lower switch configuring portion may be configured to prohibit the transmission of the normal frame at a port having not received the second control frame from the upper switching hubs, of all the ports connected to the upper switching hubs, and in which the lower switch configuring portion is configured to, when receiving the second control frame at the port having not received the second control frame from the upper switching hubs, release the prohibition of the normal frame transmission.

In the network system, the lower switching hubs and the upper switching hubs may be connected together via a plurality of transmission lines.

Effects of the Invention

According to the embodiment of the invention, it is possible to obviate a failure during automatic LAG configuration.

BRIEF DESCRIPTION OF THE DRAWINGS

The preferred embodiment according to the invention will be explained below referring to appended drawings, wherein.

DETAILED DESCRIPTION OF THE PREFERRED EMBODIMENT

Next, an embodiment according to the invention will be explained below in conjunction with the appended drawings.

Figure 1:
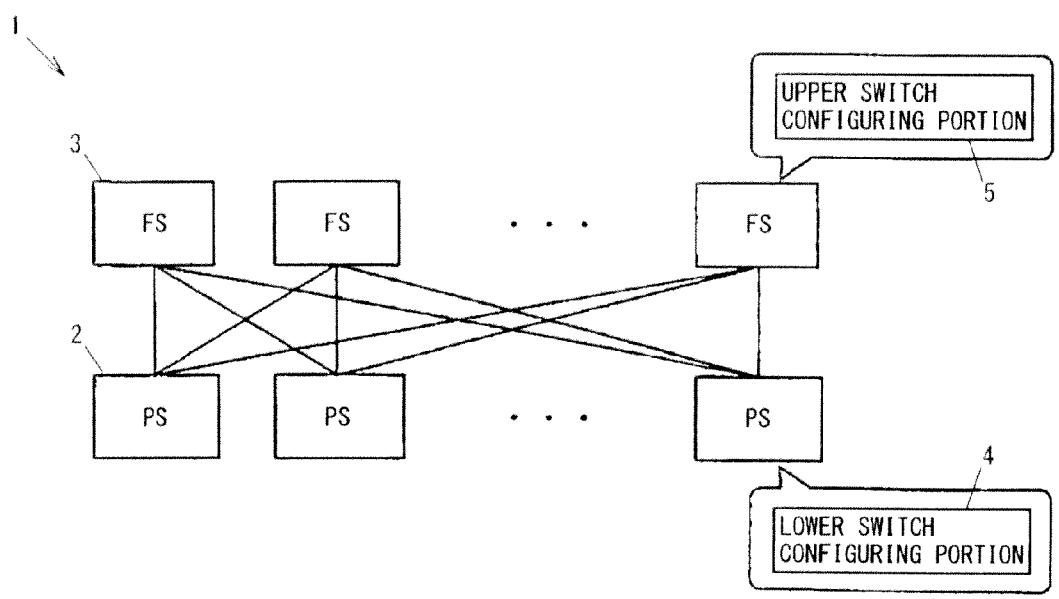
FIG. 1 is a schematic configuration diagram showing a network system in one embodiment according to the invention.

FIG. 1 is a schematic configuration diagram showing a network system according to an embodiment of the invention.

As shown in FIG. 1, a network system 1 includes a plurality of lower switching hubs 2 connected to network devices (not shown) such as servers, storages, and one or more upper switching hubs 3 connected to each of the lower switching hubs 2, to relay normal frames to be transmitted and received between the lower switching hubs 2. Herein, the lower switching hubs 2 are referred to as port switches (PS) 2 and the upper switching hubs 3 are referred to as fabric switches (FS) 3.

In this embodiment, the port switches 2 and the fabric switches 3 are switching hubs for relaying Ethernet (trademark) frames.

Each port switch 2 has a lower switch configuring portion 4, respectively, while each fabric switch 3 has an upper switch configuring portion 5, respectively. The lower switch configuring portion 4 configures a LAG (link aggregation group) for each port of the port switches 2, while the upper switch configuring portion 5 configures a LAG for each port of the fabric switches 3. The lower switch configuring portion 4 and the upper switch configuring portion 5 are realized by appropriately combining a CPU, memory, software, interface, etc.

Also, the lower switch configuring portion 4 and the upper switch configuring portion 5 are configured such that, in accordance with a preset load balancing rule, the normal frames are sorted to be transmitted from any one port of ports for which the LAGs are configured, to distribute load and transmit data at once. As the load balancing rule, there is, e.g. a method by taking an exclusive OR (XOR) of an SA, i.e. source MAC (media access control) address, and a DA (destination MAC address) contained in the normal frames, extracting low-order 5 bits thereof, and sorting the transmitting ports based on the extracted values. Incidentally, it is preferable that the load balancing rule be set to be the same for each port switch 2 and each fabric switch 3. According to this structure, the forward and return paths for normal data transmission and reception between any network devices are the same, so that it is possible to prevent flooding due to data unlearned by an FDB in the fabric switches 3, and suppress unnecessary traffic.

The lower switch configuring portion 4 configures a LAG (i.e. a first link aggregation group, referred to as a "main link") for all ports connected to the fabric switches 3, and configures sub-links for ports connected to the same fabric switches 3, based on contents of control frames received from the fabric switches 3.

In the port switch 2, the lower switch configuring portion 4 disables (prohibits) normal frame transmission at ports for which no sub-link is being configured, and enables (permits) normal frame transmission at the ports for which the sub-links are being configured.

Also, the lower switch configuring portion 4 is configured to transmit a control frame (i.e. first control frame) containing its own identifier, at predetermined time intervals, from all the ports connected to the fabric switches 3, i.e. the ports for which the main link has been configured.

On the other hand, the upper switch configuring portion 5 configures LAGs (i.e. second link aggregation groups, referred to as "sub-links") for ports connected to the same port switches 2, based on contents of control frames received from the port switches 2.

In the network system 1 in this embodiment, the upper switch configuring portion 5 is configured to transmit a control frame (i.e. second control frame) containing its own identifier, at predetermined time intervals, from the ports for which the sub-links have been configured, and is configured to disable (prohibit) normal frame transmission and reception and control frame transmission at the ports for which no sub-link is being configured.

Also, the upper switch configuring portion 5 is configured to transmit the control frame containing, in addition to its own identifier, the number of connected port switches 2, and connected port switch 2 identifiers.

More detailed operations of the lower switch configuring portion 4 and the upper switch configuring portion 5 are described along with port state transitions below.

Figure 2A:
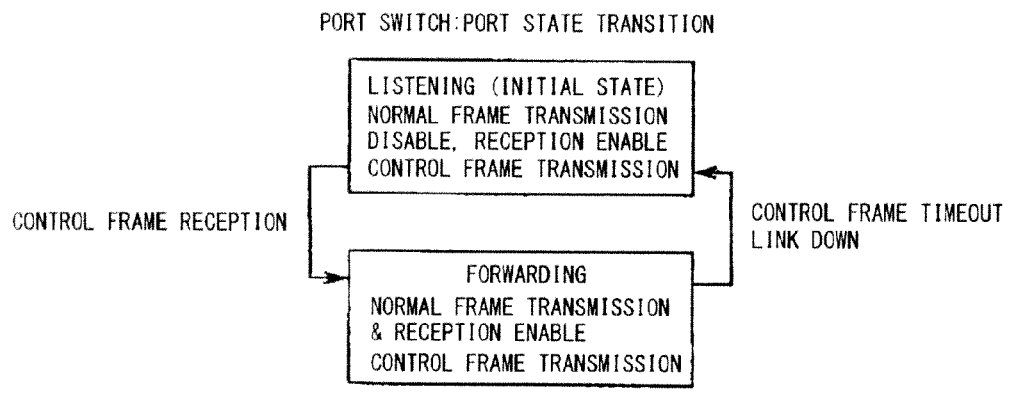
FIG. 2A is a diagram for explaining a state transition of each port of a lower switching hub (port switch)

As shown in FIG. 2A, the lower switch configuring portion 4 sets the ports for which no sub-link is being configured, i.e. the ports received no control frame from the fabric switches 3, of the port switches 2, into a state of disabling (prohibiting) normal frame transmission while disabling (permitting) normal frame reception, and performing control frame transmission. Herein, this state is referred to as listening. In the port switches 2, in an initial state in which no sub-link configuration is made at all, all the ports, i.e. all the ports for which the main link is configured, are set into the listening state.

Upon receiving the control frames in the ports for which no sub-link is being configured of the port switches 2, the lower switch configuring portion 4 configures the sub-links for the ports received the control frames, based on the source fabric switch 3 identifiers contained in the control frames received. More specifically, the lower switch configuring portion 4 configures together the ports whose "number of connected port switches" contained in the control frames received is maximal, and whose "source fabric switch identifiers" are the same, as the sub-links.

After configuring the sub-links, the lower switch configuring portion 4 releases the disabling state (prohibition) of the normal frame transmission at the ports for which those sub-links are configured. This sets the ports received the control frames into a state of enabling (permitting) the normal frame transmission and reception, and performing the control frame transmission. Herein, this state is referred to as forwarding.

Further, when a link down is detected at the ports set into the forwarding, e.g., when no control frame is received from, the fabric switches 3 for a predetermined time, the lower switch configuring portion 4 removes those ports from the sub-links, disables (prohibits) the normal frame transmission, and sets those ports into the listening state.

Figure 2B:
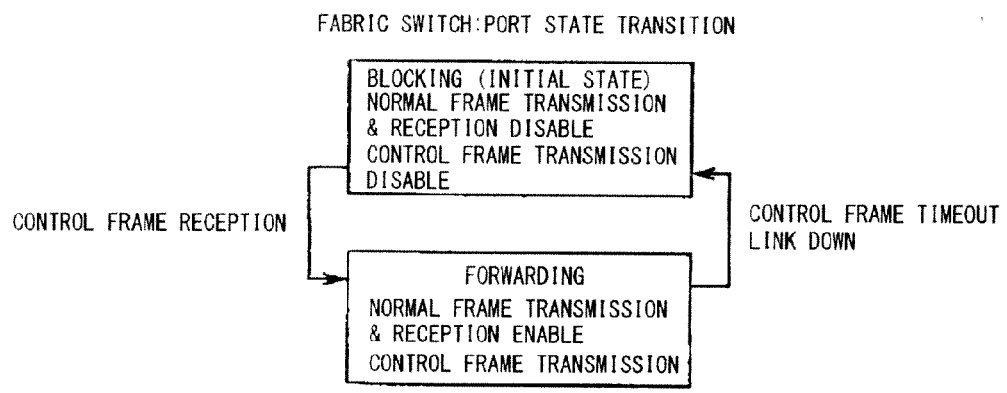
FIG. 2B is a diagram for explaining the state transition of each port of an upper switching hub (fabric switch)

On the other hand, as shown in FIG. 2B, the upper switch configuring portion 5 sets the ports for which no sub-link is being configured of the fabric switches 3, into a state of disabling (prohibiting) normal frame transmission and reception and controlling frame transmission, i.e. such a state as to permit only control frame reception. Herein, this state is referred to as blocking. In the fabric switches 3, in an initial state in which no sub-link configuration is made at all, all the ports are set into the blocking state.

Upon receiving control frames in the ports for which no sub-link is configured of the fabric switches 3, the upper switch configuring portion 5 configures the sub-links for the ports received the control frames, based on the source port switch 2 identifiers contained in the control frames received. Thereafter, the upper switch configuring portion 5 releases the disabling state (prohibition) of the normal frame transmission and reception at the ports for which the sub-links have been configured, and begins the control frame transmission. This sets the ports received the control frames, from the blocking state into the forwarding state.

Further, when a link down is detected at the ports set into the forwarding, e.g. when no control frame is received from the port switches 2 for a predetermined time, the upper switch configuring portion 5 removes those ports from the sub-links, disables (prohibits) the normal frame transmission and reception and the control frame transmission and sets those ports into the blocking state.

Next, referring to FIGS. 3A to 3D, operations for automatic LAG configuration when adding (linking up) a new transmission line between the port switch 2 and the fabric switch 3 will be explained. Incidentally, in FIGS. 3A to 3D, hatched ports indicate ports for which sub-links are being configured, while unhatched ports indicate ports for which no sub-link is being configured.

Figure 3A:
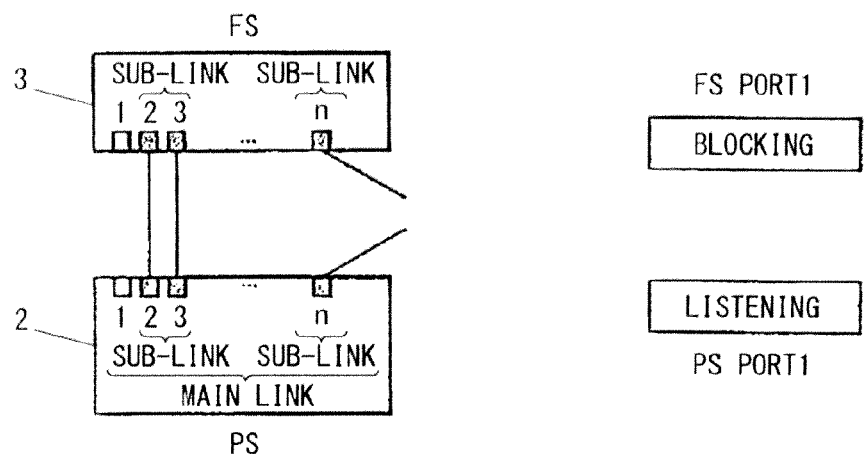
FIGS. 3A to 3D are diagrams for explaining operations for automatic LAG configuration when adding (linking up) a new transmission line between the port switch and the fabric switch.

As shown in FIG. 3A, ports 2, 3 of the port switch (PS) 2, and ports 2, 3 of the fabric switch (FS) 3 are connected together by transmission lines such as LAN cables, respectively. Also, in both of the port switch 2 and the fabric switch 3, the sub-links are being configured for the ports 2, 3. In the port switch 2, the main link is being configured for all the ports connectable to the fabric switch 3. At this point, a port 1 of the port switch 2 to which no transmission line is connected or which is in a link down state is being set into the listening state, while a port 1 of the fabric switch 3 is being set into the blocking state.

Figure 3B:
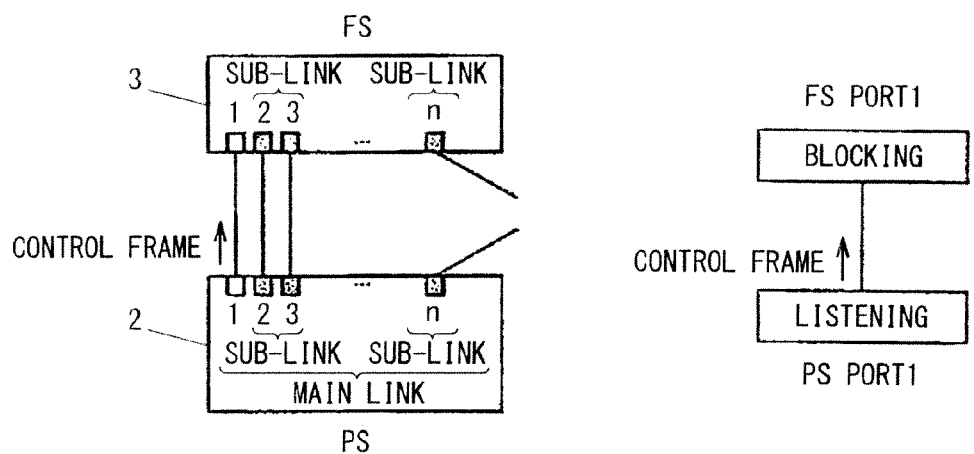

Here, as shown in FIG. 3B, the ports 1 of both the switches 2 and 3 are connected (linked up) together by a transmission line. At this point, since the port 1 of the fabric switch 3 is being set in the blocking state, no control frame is transmitted from the fabric switch 3. Thus, a control frame is transmitted from the port 1 of the port switch 2 being set in the listening state, and is received in the port 1 of the fabric switch 3 being set in the blocking state.

Figure 3C:
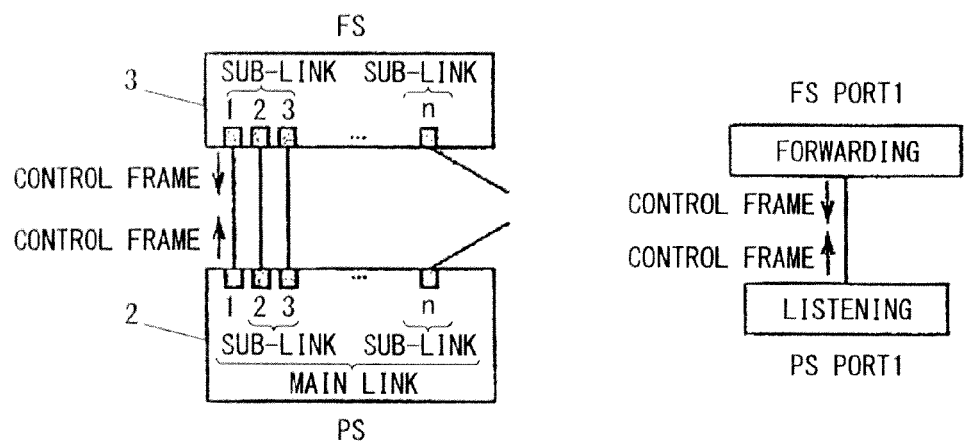

As shown in FIG. 3C, when the control frame from the port switch 2 is received in the port 1 of the fabric switch 3, the port 1 of the fabric switch 3 is added to the sub-link of the ports 2, 3, and the port 1 is set into the forwarding state. As a result, the control frame is transmitted from the port 1 of the fabric switch 3 set in the forwarding state, and received in the port 1 of the port switch 2.

Figure 3D:
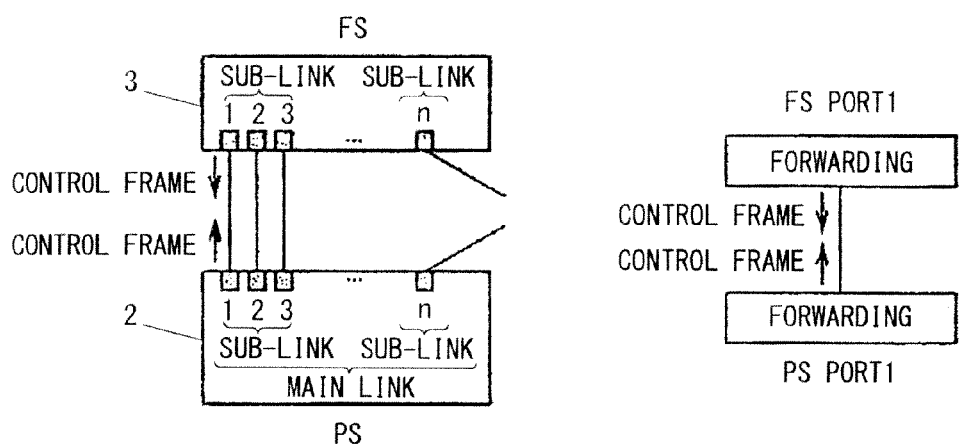
Figure 4A:
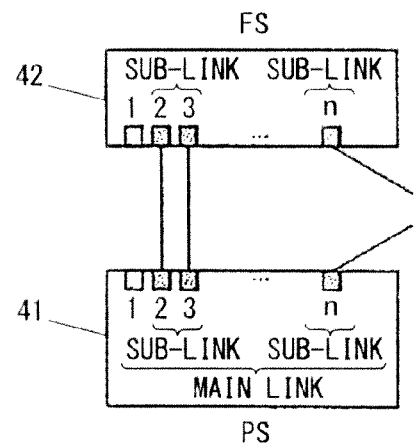
FIGS. 4A to 4C are diagrams for explaining a failure during automatic LAG configuration in a conventional network system.
Figure 4B:
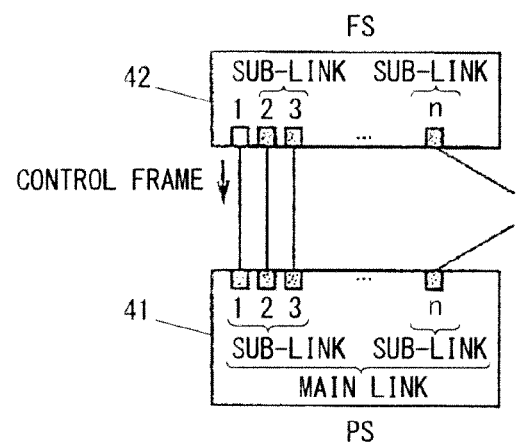
Figure 4C:
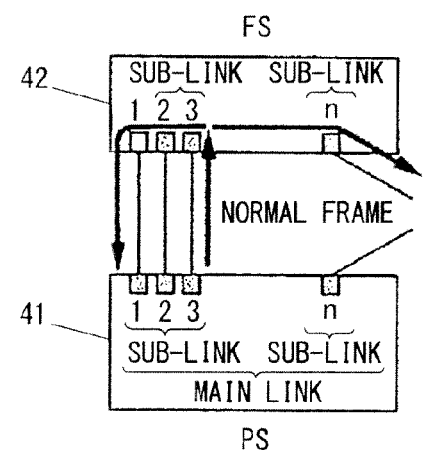

As shown in FIG. 3D, when the control frame from the fabric switch 3 is received in the port 1 of the port switch 2, the port 1 of the port switch 2 is added to the sub-link of the ports 2, 3, and the port 1 is set into the forwarding state. In this manner, the automatic LAG configuration of the ports 1 of both the switches 2 and 3 is completed.

Here, operations when transmitting a normal frame destination of which is broadcast, in the states of FIGS. 3B and 3C, i.e. the middle states from the beginning of the LAG configuration until the completion thereof will be studied.

First, when a normal frame destination of which is broadcast is transmitted from the port switch 2 to the fabric switch 3 via the port 2 or 3 in the state of FIG. 3B, since the port 1 of the fabric switch 3 is being set into the blocking state to disable (prohibit) normal frame transmission and reception, that normal frame does not turn back to the port switch 2, and no failure occurs.

Also, when a normal frame destination of which is broadcast is transmitted from the port switch 2 to the fabric switch 3 via the port 2 or 3 in the state of FIG. 3C, since the port 1 of the fabric switch 3 is already being configured as the sub-link, the normal frame received in the ports 2, 3 is not forwarded to the port 1 configured as the same sub-link. Therefore, that normal frame does not turn back to the port switch 2, and no failure occurs.

Further, when a normal frame destination of which is broadcast is transmitted from the fabric switch 3 to the port switch 2 in the state FIG. of 3B or 3C, in the port switch 2, the main link is being configured for all the ports connected to the fabric switch 3 including the ports 1 to 3, and the normal frame received in the ports configured as the main link is not forwarded to the ports configured as the same main link. Therefore, that normal frame does not turn back to the fabric switch 3, and no failure occurs.

As described above, in the network system 1 in this embodiment, in the fabric switch 3, the normal frame transmission and reception and the control frame transmission at the ports for which no LAG (sub-link) is configured are disables (prohibited).

According to this structure, it is possible to prevent such a failure that the normal frames transmitted from the port switches 2 turn back at the fabric switches 3 again to the port switches 2. Thus, the failure during automatic LAG configuration can be obviated.

Incidentally, only the disabling state (prohibition) of the normal frame transmission and reception at the ports for which no sub-link is configured is sufficient to only prevent the normal frame turning back. In this case, however, if the sub-links are first configured at the port switches 2, normal frames are transmitted to the ports at which the transmission and reception from the port switches 2 to the fabric switches 3 is disabled (prohibited), and those normal frames are likely to be lost. Therefore, the ports for which no sub-link is configured of the fabric switches 3 are set in the blocking state to disable (prohibit) the normal frame transmission and reception and the control frame transmission, so that the sub-links are configured at the fabric switches 3, first, rather than at the port switches 2.

In the network system 1, since the port switches 2 and the fabric switches 3 are connected together via the plural transmission lines, it is possible to realize the band increase by the use of the plural transmission lines in addition to the band increase by the use of the plural fabric switches 3, and it is also possible to realize the dual redundant configuration. Therefore, even in the event of a failure of one transmission line or fabric switch 3, communications can be continued with the other transmission lines or fabric switches 3.

The invention is not limited to the above embodiments, but various alterations may naturally be made without departing from the spirit and scope of the invention.

Although the invention has been described with respect to the specific embodiments for complete and clear disclosure, the appended claims are not to be thus limited but are to be construed as embodying all modifications and alternative constructions that may occur to one skilled in the art which fairly fall within the basic teaching herein set forth.

What is claimed is:

1. A network system, comprising:
   a plurality of lower switching hubs; and
   one or more upper switching hubs connected to each of the lower switching hubs, to relay a normal frame to be transmitted and received between the lower switching hubs,
   wherein each of the lower switching hubs includes a lower switch configuring portion for configuring a first link aggregation group for all ports connected to the upper switching hub, and transmitting a first control frame containing its own identifier from all the ports connected to the one or more upper switching hubs,
   wherein each of the upper switching hubs includes an upper switch configuring portion for configuring a second link aggregation group for ports connected to a same lower switching hub, based on the first control frames received from the lower switching hubs, and transmitting a second control frame containing its own identifier from the ports configured as the second link aggregation group,
   wherein the upper switch configuring portion is configured to disable transmission and reception of the normal frame and transmission of the second control frame at a port which is not configured as the second link aggregation group,
   wherein the upper switch configuring portion is configured to, when receiving the first control frame at the port which is not configured as the second link aggregation group, configure the second link aggregation group for the port having received the first control frame, thereafter enable the normal frame transmission and reception, and begin the second control frame transmission, and
   wherein, when a transmission line is connected between the upper switching hubs and the lower switching hubs, before receiving the first control frame, the upper switching hubs operate to disable the transmission and reception of the normal frame and the transmission of the second control frame, while the lower switching hubs operate to transmit the first control frame such that respective operations of the upper switching hubs and the lower switching hubs are different.

2. The network system according to claim 1, wherein the lower switching hubs and the upper switching hubs are connected together via a plurality of transmission lines.

3. The network system according to claim 1, wherein the lower switching hubs transmit the first control frame to the port which is not configured as the second link aggregation group.

4. The network system according to claim 1, wherein the upper switching hubs are connected at a port to the transmission line connected to the lower switching hubs.

5. The network system according to claim 4, wherein, when the port to the transmission line is linked up, before receiving the first control frame from the lower switching hubs, the upper switching hubs operate to disable the transmission of the second control frame.

6. The network system according to claim 4, wherein, when the port to the transmission line is linked up, before receiving the first control frame from the lower switching hubs, the upper switching hubs operate to disable the transmission and reception of the normal frame.

7. The network system according to claim 6, wherein, when the port to the transmission line receives the first control frame from the lower switching hubs, the upper switching hubs operate to configure the second link aggregation group to enable the normal frame transmission and reception, and begin the second control frame transmission.

8. The network system according to claim 1, wherein the lower switch configuring portion disables the transmission of the normal frame at a port having not received the second control frame from the upper switching hubs.

9. The network system according to claim 8, wherein the lower switch configuring portion enables the normal frame transmission after receiving the second control frame at the port having not received the second control frame from the upper switching hubs.

10. The network system according to claim 1, wherein the lower switch configuring portion enables the normal frame transmission after receiving the second control frame at a port having not received the second control frame from the upper switching hubs.

11. The network system according to claim 1, wherein the lower switch configuring portion configures the first link aggregation group for all ports connected to the upper switching hubs, and configures sub-links for ports connected to same upper switching hubs, based on contents of control frames received from the upper switching hubs.

12. The network system according to claim 11, wherein the upper switch configuring portion configures the second link aggregation groups for ports connected to same lower switching hubs, based on contents of control frames received from the lower switching hubs.

13. A network system, comprising:
a plurality of lower switching hubs; and
one or more upper switching hubs connected to each of the lower switching hubs, to relay a normal frame to be transmitted and received between the lower switching hubs,
wherein each of the lower switching hubs includes a lower switch configuring portion for configuring a first link aggregation group for all ports connected to the upper switching hub, and transmitting a first control frame containing its own identifier from all the ports connected to the one or more upper switching hubs,
wherein each of the upper switching hubs includes an upper switch configuring portion for configuring a second link aggregation group for ports connected to a same lower switching hub, based on the first control frames received from the lower switching hubs, and transmitting a second control frame containing its own identifier from the ports configured as the second link aggregation group,
wherein the upper switch configuring portion is configured to disable transmission and reception of the normal frame and transmission of the second control frame at a port which is not configured as the second link aggregation group,
wherein the upper switch configuring portion is configured to, when receiving the first control frame at the port which is not configured as the second link aggregation group, configure the second link aggregation group for the port having received the first control frame, thereafter enable the normal frame transmission and reception, and begin the second control frame transmission,
wherein the lower switch configuring portion is configured to disable the transmission of the normal frame at a port having not received the second control frame from the upper switching hubs, of all the ports connected to the upper switching hubs, and
wherein the lower switch configuring portion is configured to, when receiving the second control frame at the port having not received the second control frame from the upper switching hubs, enable the normal frame transmission.

14. The network system according to claim 13, wherein the lower switching hubs and the upper switching hubs are connected together via a plurality of transmission lines.

* * * * *